(12) United States Patent
Enevoldsen et al.

(10) Patent No.: US 8,075,267 B2
(45) Date of Patent: Dec. 13, 2011

(54) METHOD AND SENSOR SETUP FOR DETERMINATION OF DEFLECTION AND/OR STRAIN FOR FAILURE DETECTION

(75) Inventors: Peder Bay Enevoldsen, Vejle (DK); Ib Frydendal, Føvling (DK)

(73) Assignee: Siemens Aktiengesellschaft, Munich (DE)

( * ) Notice: Subject to any disclaimer, the term of this patent is extended or adjusted under 35 U.S.C. 154(b) by 666 days.

(21) Appl. No.: 12/283,098

(22) Filed: Sep. 9, 2008

(65) Prior Publication Data

US 2009/0067990 A1 Mar. 12, 2009

(30) Foreign Application Priority Data

Sep. 12, 2007 (EP) .................................. 07017913
Apr. 2, 2008 (EP) .................................. 08006747

(51) Int. Cl.
*F01D 5/00* (2006.01)
*F01D 25/00* (2006.01)
*F04D 29/00* (2006.01)
(52) U.S. Cl. .......................................... 416/61; 415/118
(58) Field of Classification Search .................... 416/61; 415/118
See application file for complete search history.

(56) References Cited

U.S. PATENT DOCUMENTS

| 7,059,822 | B2* | 6/2006 | LeMieux et al. | 415/4.3 |
| 7,124,631 | B2* | 10/2006 | Wobben | 73/170.15 |
| 7,895,018 | B2* | 2/2011 | Nies | 702/188 |
| 2006/0133933 | A1* | 6/2006 | Wobben | 416/61 |
| 2008/0164698 | A1* | 7/2008 | Habets | 290/44 |
| 2009/0068014 | A1* | 3/2009 | Enevoldsen et al. | 416/61 |

FOREIGN PATENT DOCUMENTS

| WO | 9957435 A1 | 11/1999 |
| WO | 03029750 A1 | 4/2003 |

* cited by examiner

*Primary Examiner* — Scott B Geyer

(57) ABSTRACT

A method for determining the deflection and/or strain of an elongated member of a component is provided, in which a first point and a second point are assigned to the same side of an elongated member of the component, wherein the deflection and/or strain of the elongated member is determined by determining the distance between the second point and a third point, which is connected to the first point by an inflexible support, whereby the distance between the first point and the third point is considerably longer than the distance between the second point and the third point, and wherein the distance between the second point and the third point is determined in time steps and the frequency of the change of the distance is analyzed to detect frequency changes. Furthermore, an elongated member of a component subject to strain and comprises a sensor unit for determining the deflection and/or strain of the elongated member.

20 Claims, 2 Drawing Sheets

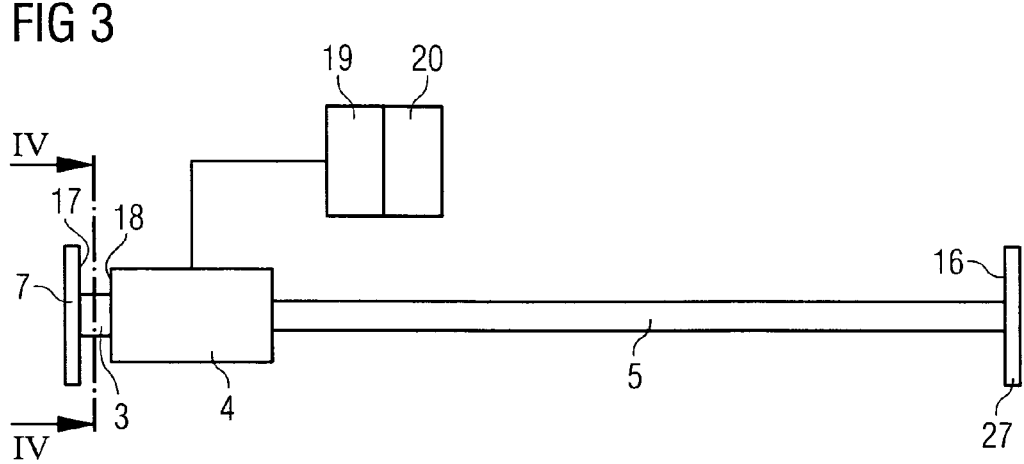
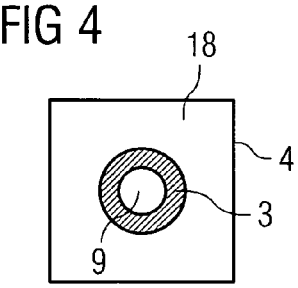
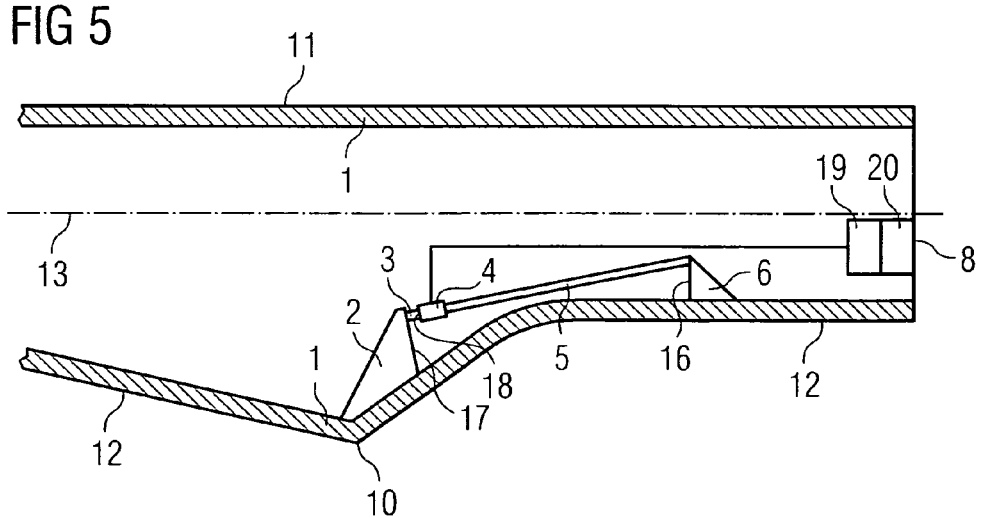

METHOD AND SENSOR SETUP FOR DETERMINATION OF DEFLECTION AND/OR STRAIN FOR FAILURE DETECTION

CROSS REFERENCE TO RELATED APPLICATIONS

This application claims the benefits of European applications No. 07017913.0 filed Sep. 12, 2007 and No. 08006747.3 filed Apr. 2, 2008, both of the applications are incorporated by reference herein in their entirety.

FIELD OF INVENTION

The present invention relates to a method and a device for deflection and/or strain measurement in elongated wind turbine elements like, for example, wind turbine rotor blades and wind turbine towers. The inventive deflection and/or strain measurement may be used for feedback to a cyclic pitch controller or as a feedback to the main turbine controller for failure detection.

BACKGROUND OF THE INVENTION

In many aspects elongated members of wind turbines are exposed to stress that causes strain. For example, the tower of a wind turbine as well as the wind turbine rotor blades may be exposed by strong wind which causes a strain on the tower and the rotor blades. The load on the rotor blades and/or the tower may be reduced by a variation of the blade's pitch. This can be realised by individual pitch controllers in general or by a cyclic pitch controller.

An effective pitch control, for example for reducing the loads acting on the rotor, needs information about the load acting on the blade root which can be extracted from a determination of the rotor blade deflection. Optical fibres in the blades are typical sensors for a reliable and long term measurement of the rotor loads. Such systems are rather expensive.

In U.S. Pat. No. 7,059,822 B2 a method for determining a rotor blade deflection is disclosed wherein a rotor blade is coupled with a hub. The rotor blade includes a beam with a first end coupled to a baffle inside the rotor blade, while the second end of the beam is located adjacent to the hub and is used for measuring the deflection of the beam by means of at least one sensor located in the hub. The beam is located near the centreline of the rotor blade. The determination of the deflection of the blade is based on the movement of the beam which correlates with the blade deflection.

SUMMARY OF INVENTION

It is a first objective of the present invention to provide an improved and advantageous method for determining the deflection and/or strain of an elongated member of a component. It is a second objective of the present invention to provide an advantageous elongated member of a component. It is a third objective of the present invention to provide an advantageous method for determining the deflection and/or strain of at least two elongated members. It is a fourth objective of the present invention to provide an advantageous wind turbine rotor blade. A fifth objective of the present invention is to provide an advantageous tower of a wind turbine.

The first objective is solved by a method for determining the deflection and/or strain of an elongated member of a component. The second objective is solved by an elongated member of a component. The third objective is solved by a method for determining the deflection and/or strain of at least two elongated members. The fourth objective is solved by a wind turbine rotor blade and the fifth objective is solved by a tower of a wind turbine. The depending claims define further developments of the invention.

In the inventive method for determining the deflection and/or strain of an elongated member of a component the deflection and/or strain is determined between a first point and a second point which are assigned to the same side of the elongated member. To determine the deflection and/or strain the distance between the second point and a third point, which is connected to the first point by an inflexible support is determined. The distance between the first point and the third point is considerably longer than the distance between the second point and the third point. Furthermore, the distance between the second point and the third point is determined in time steps and the frequency of the change of the distance is analysed to detect frequency changes. The component may, for example, be a wind turbine.

The inventive method allows for measuring defects in the elongated member, for example in a blade or a tower of a wind turbine, as frequency measurements. In case of a wind turbine it is further possible to set an alarm and/or to stop the wind turbine depending on the measurements. Generally, the signal frequencies are analysed for early detection of frequency changes, for early defect detection and for early detection of structural changes.

The invention is based on the observation that an elongated member of a component, for example a wind turbine, deflects when it is affected by strain. Due to the deflection also the distance between two distant points of the affected elongated member changes. The changed distance can be used as a measure of the deflection and/or as a measure of the strain.

The use of an inflexible support has the advantage that only a relatively small distance between the second point and a third point needs to be measured when the distance between the first and second point changes since the third point has a fixed and known relationship to the first point due to the inflexible support. The relatively small distance to be measured increases the accuracy and the robustness of the determination of the deflection and/or the strain.

The determination or measurement of the distance between the second and third points can especially be done by means of an acoustic, magnetic, electromagnetic, capacitive or inductive measurement. Preferably, the distance between the second point and the third point can be determined by means of a laser range sensor.

Furthermore, an alarm may be set and/or an operation may be modified depending on the determined distance and/or frequency and/or frequency change. For example, the operation of a wind turbine can be stopped or the rotation speed of a wind turbine can be lowered when the determined distance and/or frequency and/or frequency change achieves a particular value.

The measured change of strain and/or frequency of each blade may also be compared with the measured change of strain and/or frequency of the other blades while the wind turbine is running. This gives a more robust signal for the wind turbine controller to ensure that the wind turbine is only stopped or slowed down if it is really necessary.

In order to further increase the accuracy in determining the deflection and/or strain of the elongated member of the component, especially of a wind turbine, the method can be performed at least two sides of the elongated member. The sides can be perpendicular or parallel and/or opposite to each other. Then the distance between second points and third points which are assigned to a same side of the elongated member may be separately determined for each of the sides.

For example, the determination of the distance at two parallel and opposite sides of the elongated member which is subject to bending provides two different results, which represent compression and stretch. At one side, the distance between two distant points, i.e. the first and the second point, assigned to this side decreases compared to the distance between these points when the elongated member is not subject to bending. The decreased distance is due to a compression of this side. Because of the inflexible or stiff support between the first point and a third point, the decreased distance can be measured with high accuracy between the second and the third point. At the second side, the distance between two distant points, i.e. the first and the second point, assigned to this side increases due to a stretch of this side. This increased distance can be measured between the second and the third point assigned to this side.

Furthermore, the distance can be determined at sides which run perpendicular to each other. This provides information about the deflection in perpendicular directions. Of course, to increase the accuracy the distance at two or more parallel and at two or more opposite sides of the affected elongated member can be measured to determine deflection and/or the strain in each direction.

The inventive method can preferably be applied to wind turbine rotor blades or wind turbine towers. In the case of an application in a wind rotor blade the results regarding the deflection and the strain acting on the rotor blade may be used as feedback for cyclic pitch control or for individual pitch control in general. Individual pitch control denotes pitch control where the blades are pitched more or less independently of each other. Pitch control schemes are often used to reduce the loads acting on the blades and hence the resulting deflections and strains.

The inventive elongated member of a component, for example of a wind turbine, is potentially subject to strain. It comprises a sensor unit for determining the deflection and/or strain of the elongated member between a first point and a second point, which are assigned to the same side of the elongated member. The sensor unit comprises a proximity sensor for determining the distance between the second point and a third point. The third point is connected to the first point by an inflexible or stiff support. The distance between the first point and the third point is considerably longer than the distance between the second point and the third point. The sensor unit further comprises a frequency detecting unit for detecting the frequency of the change of the distance. The frequency detecting unit allows for an early detection of frequency changes and by this means allows for an early detection of structural changes.

The inflexible or stiff support may be made of the same material as the component in order to compensate for thermal expansion.

The sensor may be located at the second point or at the third point. Moreover, the sensor unit can comprise a compressible and/or stretchable element located between the second point and the third point. The compressible and/or stretchable element may comprise a hollow space extending from the second point to the third point. This makes it possible to measure the distance inside the hollow space which reduces environmental influences. The compressible and/or stretchable element may, for example, be a rubber support or a telescope unit. If the support is designed as a telescope it is advantageous when the telescope has low friction.

The proximity sensor can, for example, be an acoustic sensor, a magnetic sensor, an electromagnetic sensor, a capacitive sensor or an inductive field effect sensor. Preferably, the proximity sensor can be a laser range sensor.

In the inventive method for determining the deflection and/or strain of at least two elongated members, as previously described, the distance between the second point and the third point of each elongated member is determined in time steps and the frequency of the change of the distance is analysed to detect the frequency change. This allows for an early detection of frequency changes and of structural changes.

The determined distance and/or frequency and/or change of frequency of one or more elongated members may be compared to the determined distance and/or frequency and/or change of frequency of one or more other elongated members. Moreover, an alarm can be set and/or the wind turbine can be slowed down or stopped depending on the determined distance and/or frequency and/or change of frequency of one or more of the elongated members compared to the determined distance and/or frequency and/or change of frequency of one or more of the other elongated members. Each elongated member may especially be part of a wind turbine rotor blade. Furthermore, each separate elongated member is part of a different or separate wind turbine rotor blade.

The inventive wind turbine rotor blade comprises an inventive elongated member as previously described. Advantageously, the elongated member can comprise at least two sensor units. The at least two sensor units can be arranged such that their inflexible supports extend parallel to each other at different sides of the elongated member. Alternatively or additionally, sensor units can also be arranged such that their inflexible supports extend perpendicular to each other. The rotor blade may comprise a blade root and a shoulder and the sensor unit can preferably be located between the blade root and the shoulder. A positioning of the sensor unit near the blade root is advantageous because the moment due to the bending is mainly acting at the rotor blade near the blade root.

Alternatively, the rotor blade may comprise a blade root and a shoulder portion, which is the portion adjacent to the shoulder towards the blade root, and the sensor unit may be located at the shoulder portion.

The sensor unit can generally be applied in connection with cyclic pitch control and for individual pitch controllers. Individual pitch control denotes pitch control where the blades are pitched more or less independently of each other. Moreover, the determination of the deflection and/or the strain induced to the blade root may provide accuracy in blade root sidewise moment signals that makes stall detection, based on lift/drag calculation, possible.

The inventive tower of a wind turbine comprises an inventive elongated member as previously described. Preferably the inventive elongated member of the wind turbine tower with the sensor unit is located near the tower bottom or near the tower top. What was said with respect to parallel and perpendicular extension of the inflexible support members of two or more sensor units in wind turbine blades is also applicable to wind turbine towers.

As the deflection and/or the strain is determined by means of the inventive method or by means of any of the inventive devices, the obtained result has the following qualities: the measurement is significantly more robust regarding local geometry. Furthermore, the measurement is more robust due to large dynamic range in the proximity measurement.

BRIEF DESCRIPTION OF THE DRAWINGS

Further features, properties and advantages of the present invention will become clear from the following description of an embodiment in conjunction with the accompanying draw- FIG. 1 schematically shows an elongated member of a wind turbine which is not deflected in a sectional view.

FIG. 3 schematically shows the sensor unit.

FIG. 4 schematically shows a view along the direction IV-IV in FIG. 3.

FIG. 5 schematically shows a part of a wind turbine rotor blade in a sectional view.

DETAILED DESCRIPTION OF INVENTION

Figure 1:
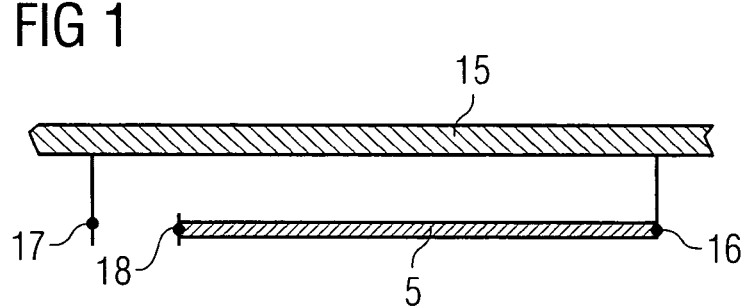

An embodiment of the present invention will now be described with reference to FIGS. 1 to 5. At first, the general principle or the idea of the invention will be explained with reference to FIG. 1. FIG. 1 schematically shows an elongated member of a wind turbine 15 which is not deflected in a sectional view. The elongated member 15 comprises two distant points, a first point 16 and a second point 17. It further comprises a third point 18 which is connected to the first point 16 by means of an elongated inflexible or stiff support 5, for example a stiff rod. In FIG. 1 the inflexible support 5 extends parallel to the elongated member 15. Moreover, the third point 18 is located between the first point 16 and the second point 17. The distance between the first point 16 and the third point 18 is much longer than the distance between the second point 17 and the third point 18. In case of a deflection of the elongated member 15, the distance between the first point 16 and the second point 17 changes and therefore also the distance between the second point 17 and the third point 18 changes. To determine the deflection the distance between the second point 17 and the third point 18 can be determined or measured, preferably by a laser range sensor or any other proximity gage. The used proximity sensor can be located at the second point 17 or at the third point 18. With the invention, only the relatively small distance between the second point 17 and the third point 18 has to be determined, which increases the accuracy of the measurement.

Figure 2:
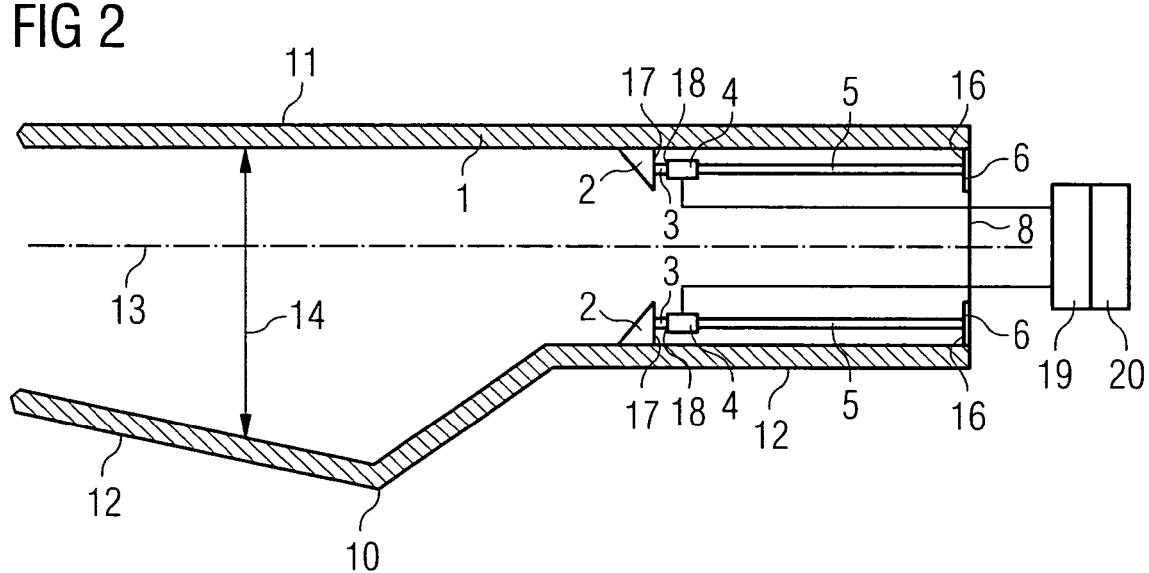
FIG. 2 schematically shows a part of a wind turbine rotor blade in a sectional view.

FIG. 2 schematically shows a part of the wind turbine rotor blade 1 in a sectional view. The rotor blade 1 comprises a blade root 8, a leading edge 11, a trailing edge 12 and a shoulder 10 which is the point of the blade's greatest width. The blade 1 is typically mounted to a rotor hub at the blade root 8. The centreline 13 (also called span) of the rotor blade 1 extend from the centre of the blade root 8 to the tip of the blade which is not shown in FIG. 2. The so called chord 14 characterises the width of the blade 1 perpendicular to the centreline 13. The region where the chord 14 reaches its highest value is called the shoulder 10 of the blade 1, i.e. the location of the blade's greatest width. The trailing edge 12 connects the blade root 8 via the shoulder 10 to the tip of the blade 1. The leading edge 11 is the side which connects the blade root 8 to the tip and extends opposite the trailing edge 12 as seen in a chordwise direction.

The wind turbine blade 1 is hollow inside. It further comprises two sensor units inside its hollow body for determining the deflection of the blade 1, at least one frequency detecting unit 19 and an analyser 20. One sensor unit is mounted with the stiff support 5 extending along the leading edge 11 near the blade root 8 while the other sensor unit is mounted with the stiff support 5 extending along the trailing edge 12 near the blade root 8.

Each sensor unit for the determination of the deflection near the blade root 8 comprises an inflexible or stiff support 5, a proximity sensor 4, a compressible element 3 and a reference fitting 2. The reference fitting 2 comprises the second point 17. One end of the inflexible support 5 is fixed to the blade root 8 by a fixation 6 on which the first point 16 is located. The proximity sensor 4 is mounted to the other end of the inflexible support 5 and provides the third point 18. The proximity sensor 4 is further connected to the reference fitting 2 via the compressible and/or stretchable element 3, which is, in the present embodiment, a rubber support in form of a rubber sleeve. Alternatively, the proximity sensor 4 may be mounted to the reference fitting 2 and may provide the second point 17. The third point 18 would then be provided by the loose end of the inflexible support 5.

In the present embodiment the sensor 4 is a proximity gage, for instance a laser range sensor. Generally, the proximity measurement may be based on acoustic, magnetic, electromagnetic, capacitive or inductive field effects. The proximity sensor 4 in the present embodiment measures or determines the distance between the proximity sensor 4, which defines the third point 18, and the reference fitting 2, which defines the second point 17.

The frequency detecting unit 19 and an analyser 20 are connected to the proximity sensors 4. The frequency detecting unit 19 detects the frequency of the distances which are measured by the proximity sensors 4. The obtained signal frequencies are analysed by the analyser 20 for early detection of frequency changes.

In conjunction with the known length of the inflexible support 5 the measured distance between the proximity sensor 4 and the reference fitting 2 can be used to provide a measure for, or to determine, the distance between the second point 17 and the first point 16, which corresponds to the difference between the reference fitting 2 and the fixation 6 of the inflexible support 5 to the blade root 8. This means that the distance between two distant points, namely the first point 16 and the second point 17, is determined and provides information about the deflection of the elongated member between these two points.

When no deflection occurs, the inflexible support 5 of one sensor unit of the two sensor units is parallel to the leading edge 11 and the inflexible support 5 of the other sensor unit of the two sensor units is parallel to the trailing edge 12. In the present embodiment the leading edge 11 and the trailing edge 12 are parallel to each other near the blade root 8. In the case of a deflection of the turbine blade, the leading edge 11 and the trailing edge 12 deflect. This results in a change of distance between the reference fitting 2 and the fixation 6 of the respective sensor unit. For instance, the distance between the first point 16 and the second point 17 of the sensor unit which is parallel to the leading edge 11 increases and the distance between the first point 16 and the second point 17 of the sensor unit which is parallel to the trailing edge 12 decreases when the rotor blade is deflected towards the trailing edge.

Due of the fact that the distance between the proximity sensor 4 and the fixation 6, which is the distance between the second point 17 and the first point 16, cannot change because of the inflexibleness of the inflexible support 5, the changed distance between the fixation 6 and the reference fitting 2 occurs as a change of the distance between the proximity sensor 4 and the reference fitting 2, which is the distance between the second point 17 and the third point 18. This changed distance is measured by the proximity sensor 4 and can be used to determine the deflection of the rotor blade 1 and/or the strain acting on the rotor blade 1.

FIG. 3 schematically shows one of the sensor units. The sensor unit comprises two mounting brackets 7, 27 an inflexible support 5, a sensor 4 and a rubber sleeve as a compressible and/or stretchable element 3. The left mounting bracket 7 in FIG. 3 can be used to fix the sensor unit to the reference fitting 2 and provides the second point 17. The right mounting bracket 27 in FIG. 3 can be used to mount the sensor unit to the fixation 6 and provides the first point 16. Alternatively, the right mounting bracket 27 may be fixed to the reference fitting 2 and the left mounting bracket 7 to the fixation 6, which would locate the sensor 4 close to the blade root 8. The sensor 4 is connected to a frequency detecting unit 19 and an analyser 20.

One end of the inflexible support 5 is fixed to the right mounting bracket 27, which corresponds to the first point 16. The proximity sensor 4, which is a laser range sensor in the present embodiment, is mounted to the other end of the inflexible support 5 and provides the third point 18. In FIG. 3 the rubber sleeve 3 is placed between the proximity sensor 4 and the left mounting bracket 7, which corresponds to the second point 17. Instead of a rubber sleeve a different rubber support or a telescope unit with low friction may be used as well.

A sectional view along the direction indicated by line IV-IV in FIG. 3 is shown in FIG. 4. FIG. 4 schematically shows the cross-section of the rubber sleeve 3 of the present embodiment. The rubber sleeve 3 has a circular cross-section with a hollow space 9 in its centre. One can further see in the background of FIG. 4 the proximity sensor 4 and the corresponding third point 18, which is schematically represented by a surface of the proximity sensor 4. Advantageously, the proximity measurement is performed inside the hollow space 9 of the compressible element 3. This allows an undisturbed measurement by avoiding environmental influences.

Now a variant of the present invention will be described with reference to FIG. 5. FIG. 5 schematically shows a part of a wind turbine rotor blade in a sectional view. Elements corresponding to elements of FIGS. 1 to 4 are designated with the same reference numerals and will not be described in detail again. In contrast to FIG. 2 the reference fitting 2 is mounted at the trailing edge 12 at the shoulder 10. The fixation 6 of the inflexible support 5 is mounted at the trailing edge 12 between the shoulder 10 and the blade root 8. This arrangement allows a determination of the deflection and/or the strain of the shoulder portion, which is the portion adjacent to the shoulder 10 towards the blade root 8.

In all described variants the inflexible support 5 can advantageously be made of the same material as the rotor blade in order to compensate for thermal expansion.

The distance between the second point 17 and the third point 18 is determined in time steps and the frequency of the change of the distance is analysed by the analyser 20 to detect frequency changes. In addition to analysing the measurement signal for absolute changes, the signal frequencies are analysed for early detection of frequency changes.

Furthermore, an alarm may be set and/or an operation may be modified depending on the determined distance and/or frequency and/or frequency change. For example, the operation of the wind turbine can be stopped or the rotation speed of the wind turbine can be lowered when the determined distance and/or frequency and/or frequency change achieves a particular value.

Generally the number of used sensor units can vary depending on the characteristics of the deflection or the strain which shall be measured. In the present embodiment the sensor setup measures edge-wise strains which allow for determining edge-wise moments. Furthermore, flap-wise moments can be measured by similar sensor units rotated by 90°, for example parallel to the chord 14. If sensor units in both orientations are present, this would provide a means for determining moments about two axes. Of course, it is also possible to use only one sensor unit for determining the deflection and/or the strain and/or the moments about each axis.

The described sensor unit may also be applied to other parts of a wind turbine rotor blade or to the tower of a wind turbine, for instance at the tower bottom or the tower top.

Compared to the cited state of the art the present invention provides a cheap possibility to determine the deflection and/or the strain of an elongated member of a wind turbine because the described sensor unit can easily be mounted at each desired position. Furthermore, the present invention allows for measurements with a very high accuracy because, in contrast to the cited state of the art, the deflection or the strain is determined where the deflection or the strain occurs, that is in the vicinity of a side of the elongated member which is subject to strain and not near the centreline of a hollow body of the elongated member as it is proposed in U.S. Pat. No. 7,059,822 B2.

Furthermore, the described determination of the deflection and/or the strain is robust regarding variations in the local geometry. Due to a large dynamic range in the proximity measurement, the invention provides very accurate results. Moreover, the analysis of the frequency of the change of the distance allows for early failure detection.

The invention claimed is:

1. A wind turbine rotor blade, comprising
a blade root;
a leading edge extending away from the blade root along a centerline that is perpendicular to the blade root;
a trailing edge opposite the leading edge and extending away from the blade root, wherein
the leading edge and the trailing edges together form a hollow blade body, and
a shoulder of the blade body resides at a maximum width location between the leading and trailing edges of the blade body; and
a sensor unit arranged along the elongated member, where the sensor unit detects a deflection and/or strain of the elongated member between the first and second points, the sensor unit comprising
a proximity sensor that determines a distance between the second point and the third point,
an inflexible support that connects the first point to the third point, where the distance between the first point and the third point being longer than the distance between the second point and the third point, and
a frequency detecting unit connected to the proximity sensor wherein the frequency detecting unit detects a frequency of a change of the distance between the second and third points.

2. The wind turbine rotor blade as claimed in claim 1, wherein the elongated member comprises at least two sensor units.

3. The wind turbine rotor blade as claimed in claim 2, wherein two sensor units are arranged such that each inflexible support extends parallel to each other at different sides of the elongated member.

4. The wind turbine rotor blade as claimed in claim 3, wherein two sensor units are arranged such that their inflexible supports extend perpendicular to each other.

5. An elongated member of a wind turbine component subject to strain, the elongated member having a first, second and third points all along a same side of the elongated member and where the third point is arranged between the first and second point, comprising:

a sensor unit arranged along the elongated member, where the sensor unit detects a deflection and/or strain of the elongated member between the first and second points, the sensor unit comprising a proximity sensor that determines a distance between the second point and the third point, an inflexible support that connects the first point to the third point, where the distance between the first point and the third point being longer than the distance between the second point and the third point, and a frequency detecting unit connected to the proximity sensor wherein the frequency detecting unit detects a frequency of a change of the distance between the second and third points.

6. The elongated member as claimed in claim 5, wherein the proximity sensor is located at the second point or at the third point.

7. The elongated member as claimed in claim 6, wherein the sensor unit comprises a compressible and/or stretchable element arranged between the second point and the third point.

8. The elongated member as claimed in claim 7, wherein the compressible and/or stretchable element comprises a hollow space extending from the second point to the third point.

9. The elongated member as claimed in claim 8, wherein the compressible and/or stretchable element is a rubber support or a telescope unit.

10. The elongated member as claimed in claim 9, wherein the proximity sensor is an acoustic sensor, a magnetic sensor, an electromagnetic sensor, a capacitive sensor or an inductive field effects sensor.

11. The elongated member as claimed in claim 10, wherein the proximity sensor is a laser range sensor.

12. A method for determining the deflection of an elongated member of a component of a wind turbine where the component has a plurality of sides, comprising:

assigning a first point, a second point and a third point along a same side of the elongated member where the first, second and third points are all co-linear and where the third point is arranged between the first and second points and the distance between the first and third points is greater than the distance between the second and third points;

connecting the first point to the third point by an inflexible support;

determining a distance between the second point and the third point in time steps; and analyzing a frequency of a change of the determined distance to detect frequency changes.

13. The method as claimed in claim 12, wherein the distance between the second point and the third point is determined based on a measurement, where the measurement is of the type selected from the group consisting of: acoustic, magnetic, electromagnetic, capacitive and inductive.

14. The method as claimed in claim 12, wherein the distance between the second point and the third point is determined by a laser range sensor.

15. The method as claimed in claim 14, wherein an alarm is set and/or an operation is modified depending on the determined distance and/or frequency and/or frequency change.

16. A method for determining a strain of a plurality of elongated members, comprising:

assigning a first point, a second point and a third point along a same side of the elongated member where the first, second and third points are all co-linear and where the third point is arranged between the first and second points and the distance between the first and third points is greater than the distance between the second and third points;

connecting the first point to the third point by an inflexible support;

determining a distance between the second point and the third point in time steps; and analyzing a frequency of a change of the determined distance to detect frequency changes.

17. The method as claimed in claim 16, wherein the determined distance and/or frequency and/or change of frequency of one or more elongated members is compared to the determined distance and/or frequency and/or change of frequency of one or more other elongated members.

18. The method as claimed in claim 17, wherein the elongated members are components of a wind turbine, and an alarm is set and/or the wind turbine is slowed down or stopped depending on the determined distance and/or frequency and/or change of frequency of one or more of the elongated members compared to the determined distance and/or frequency and/or change of frequency of one or more of the other elongated members.

19. The method as claimed in claim 18, wherein each elongated member is part of a wind turbine rotor blade.

20. The method as claimed in claim 19, wherein each separate elongated member is part of a different or separate wind turbine rotor blade.

* * * * *